(12) United States Patent
Avati et al.

(10) Patent No.: US 11,016,944 B2
(45) Date of Patent: *May 25, 2021

(54) TRANSFERRING OBJECTS BETWEEN DIFFERENT STORAGE DEVICES BASED ON TIMESTAMPS

(71) Applicant: Red Hat, Inc., Raleigh, NC (US)

(72) Inventors: Anand Vishweswaran Avati, Mountain View, CA (US); Amar Tumballi Suryanarayan, Shimoga (IN)

(73) Assignee: Red Hat, Inc., Raleigh, NC (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/357,302

(22) Filed: Mar. 18, 2019

(65) Prior Publication Data
US 2019/0213172 A1 Jul. 11, 2019

Related U.S. Application Data

(63) Continuation of application No. 14/078,353, filed on Nov. 12, 2013, now Pat. No. 10,235,382.

(51) Int. Cl.
| | |
|---|---|
| *G06F 16/00* | (2019.01) |
| *G06F 16/178* | (2019.01) |
| *G06F 16/27* | (2019.01) |
| *G06F 11/20* | (2006.01) |

(52) U.S. Cl.
CPC .......... *G06F 16/178* (2019.01); *G06F 16/275* (2019.01); *G06F 11/2094* (2013.01); *G06F 2201/835* (2013.01)

(58) Field of Classification Search
CPC .. G06F 11/2094; G06F 16/178; G06F 16/275; G06F 2201/835
See application file for complete search history.

(56) References Cited

U.S. PATENT DOCUMENTS

| | | | |
|---|---|---|---|
| 8,713,098 | B1 | 4/2014 | Adya et al. |
| 2008/0104443 | A1* | 5/2008 | Akutsu ............... G06F 11/2084 714/6.12 |
| 2009/0031389 | A1 | 1/2009 | Riley |
| 2009/0075643 | A1 | 3/2009 | Lock et al. |
| 2011/0137864 | A1 | 6/2011 | Deshmukh et al. |

(Continued)

*Primary Examiner* — Dinku W Gebresenbet
(74) *Attorney, Agent, or Firm* — Lowenstein Sandler LLP

(57) ABSTRACT

A method includes receiving, by a first computing device of a distributed file system from a second computing device, a first timestamp associated with a first version of a set of objects stored on the second computing device, the first timestamp corresponding to a modification time of the first version of the set of objects, or a first transfer time of the first version of the set of objects from at least one of the first computing device or a third computing device of the distributed file system to the second computing device. The method also includes identifying a second version of the set of objects stored on the first computing device, the second version of the set of objects having a second timestamp, the second timestamp corresponding to a modification time of the second version of the set of objects or a second transfer time. The method further includes transferring the second version of the set of objects to the second computing device to be stored on the second computing device.

17 Claims, 6 Drawing Sheets

(56) References Cited

U.S. PATENT DOCUMENTS

| | | | |
|---|---|---|---|
| 2011/0161335 A1* | 6/2011 | Dash | G06F 16/182 707/758 |
| 2013/0173537 A1* | 7/2013 | Wilkinson | G06F 11/1471 707/611 |
| 2013/0290385 A1 | 10/2013 | Morrey et al. | |
| 2014/0006464 A1 | 1/2014 | Pitts | |

* cited by examiner

TRANSFERRING OBJECTS BETWEEN DIFFERENT STORAGE DEVICES BASED ON TIMESTAMPS

RELATED APPLICATIONS

This application is a continuation application of co-pending U.S. patent application Ser. No. 14/078,353, filed Nov. 12, 2013, entitled, "TRANSFERRING OBJECTS BETWEEN DIFFERENT STORAGE DEVICES BASED ON TIMESTAMPS," which is herein incorporated by reference.

TECHNICAL FIELD

The present disclosure relates to file systems, and more particularly, to transferring objects between storage devices of a file system.

BACKGROUND

Data may be stored as unstructured data, for example, in files and directories in a file system. A distributed file system may store multiple copies of a file and/or directory on more than one storage device to help ensure that, in case of a hardware failure and/or system failure, the data is still accessible. If a computing device coupled to a storage device experiences a failure, the storage device may be unavailable, but changes can still be made to the data on the copies of the data on the available storage devices. Sets of computing devices may periodically transfer objects stored in the storage devices coupled to the sets of computing devices to a separate computing device (e.g., may back up or replicate the objects on a remote computing device). This may allow the distributed file system to help prevent data loss.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
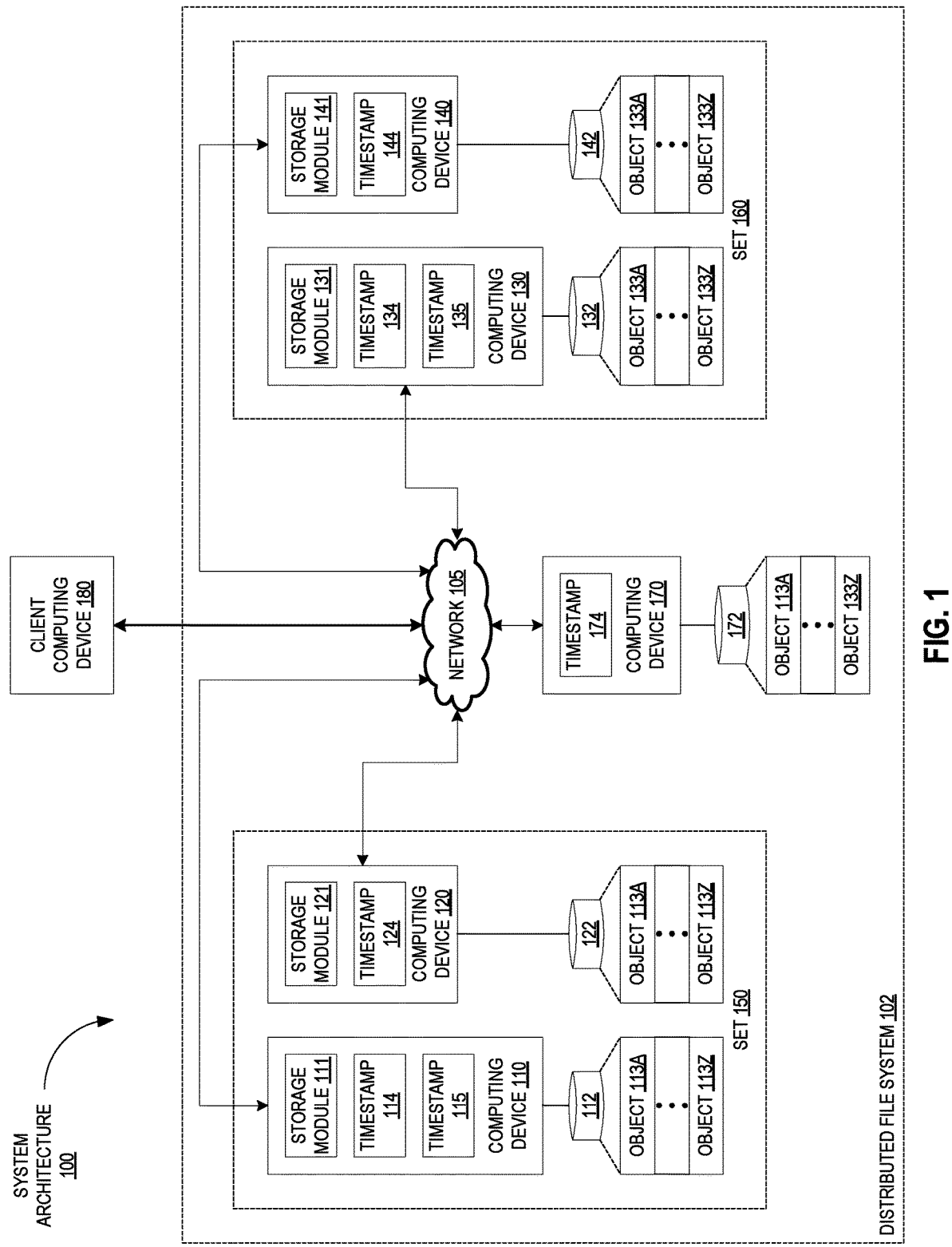
FIG. 1 is a block diagram illustrating an example system architecture, in accordance with one embodiment of the present disclosure.

A distributed file system may store multiple copies of a file and/or directory on more than one storage device to help ensure that data is still accessible in the event that one or more computing devices fail. Computing devices may be grouped into sets of computing devices and the data in storage devices coupled to the computing devices may be duplicated or replicated to help prevent data loss. In addition, the computing devices in the sets of computing devices may transfer data (e.g., replicate and/or back up the data) to an additional computing device to further prevent data loss. Allowing multiple computing devices from multiple sets of computing devices to transfer data to additional computing device may allow the distributed file system to transfer (e.g., back up or replicate) data more quickly and/or more efficiently. Each set of computing devices may include a primary computing device and one or more secondary computing devices. The primary computing device may manage access to the data stored in the storage devices of the set and may also manage the transfer of data to the additional computing devices. The secondary computing device may resume or take over such functions when the primary computing device becomes unavailable or inoperative (e.g., crashes).

Described herein are mechanisms for transferring objects (e.g., files, directories, sub-directories) from one storage device to another storage device of a file system, according to various implementations. In one embodiment, when a first computing device transfers objects to the additional computing device, the computing device may query other computing devices in the distributed file system to determine the times when the other computing devices also transferred objects to the additional computing device. The first computing device may determine the earliest time out of the times when the other computing devices also transferred objects to the additional computing device and may store this earliest time on the additional computing device. In one embodiment, because a secondary computing device may not know the point in time when the primary computing device from its set has transferred data to the additional computing device, the secondary computing device uses the timestamp from the additional computing device to determine which objects should be transferred to the additional computing device. For example, the secondary computing device may transfer objects that were modified after the time indicated by the timestamp. In another embodiment, different copies of an object may be modified on different storage devices (e.g., modified at different locations). Each copy of the object may be associated with a set of timestamps that may indicate times when the copy of the object was modified on each of the different storage devices. The sets of timestamps for different copies of the object may be analyzed and data may be transferred from a first storage device to a second storage device or vice versa, based on the analysis of the sets of timestamps.

FIG. 1 is a block diagram illustrating an example system architecture 100, in accordance with one embodiment of the present disclosure. The system architecture 100 includes distributed file system 102 and client computing device 180. The distributed file system 102 includes computing devices 110, 120, 130, 140, and 170, a network 105 and storage devices 112, 122, 132, and 142. Network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, other computing devices (e.g., server computers), and/or a combination thereof. The storage devices 112, 122, 132, and 142 may be one or more of a memory (e.g., random access memory), a cache, a drive (e.g., a hard drive or a disk drive), a flash drive (e.g., a solid state disk drive), a database system, mass storage devices (e.g., as magnetic or optical storage based storage devices), or another type of component or device capable of storing data. Each of the computing devices 110, 120, 130, 140, 170, and 180 may be a personal digital assistant (PDA), a mobile phone, a smart phone, a cellular phone, a rackmount server, a server computer, a mainframe computer, a personal computer (PC), a laptop computer, a tablet computer, a netbook computer, etc.

The distributed file system 102 may include multiple objects 113A through 133Z. The objects 113A through 133Z may be files, directories, links (e.g., hard links or symbolic links), etc. In one embodiment, each object 113A through 133Z may include and/or be associated with one or more attributes (e.g., data that provides information about an object, such as an owner of the object, permissions to the object, a time when the object was created, a time when the object was modified, etc.). One of the attributes may indicate the time when the last change operation was performed on the object. A change operation may be an operation and/or action that changes one or more of the objects 113A through 133Z.

The client computing device 180 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The client computing device 180 may include one or more applications (e.g., software modules, programs, services, etc.) that a user may use to perform various tasks. An application (not shown in the figures) may be any type of application including, for example, a web application, a desktop application, a database management application, a browser application, etc. In one embodiment, the client computing device 180 may be a virtual machine (not shown in the figures) that is hosted by another computing device (not shown in the figures). The client computing device 180 may request access to the one or more of the objects 113A through 133A. For example, an application 104 may request access (e.g., read, write, etc.) to the one or more files and/or directories (e.g., one or more object) stored on the storage devices 112, 122, 132, and/or 142.

The client machine 180 may also include a file system client (not shown in the figures) to communicate with the computing devices 110 through 140 in the distributed file system 102. Examples of a file system client may include, and are not limited to, native file system clients and network file system (NFS) clients. "Native" can describe support for specific operating systems. For example, a native file system client may be, and is not limited to, a file system client that supports the Linux operating system.

The distributed file system 102 includes sets 150 and 160. Set 150 includes computing devices 110 and 120, and set 160 includes computing devices 130 and 140. In one embodiment, multiple copies of the data (e.g., objects 113A through 133Z) in the distributed file system 102 can be stored on the computing devices 120 through 140 for redundancy to prevent data loss. For example, computing devices 110 and 120 are respectively coupled to storage devices 112 and 122. Storage devices 112 and 122 may store the same objects 113A through 113Z (e.g., the same files, directories, links, etc.). In another example, computing devices 130 and 140 are respectively coupled to storage devices 132 and 142. Storage devices 132 and 142 may store the same objects 133A through 133Z (e.g., the same files, directories, links, etc.).

In one embodiment, the storage modules 111, 121, 131, and 141 may manage the data (e.g., objects 113A through 133Z) being replicated in the sets 150 and/or 160 using a replication directory hierarchy, which may be a directory structure that contains the files and directories being replicated amongst the computing devices 110 through 140. The computing devices 110, 120, 130, and 140 may be grouped in the sets 150 and 160 to store the multiple copies of data (e.g., objects 113A through 113Z and objects 133A through 133Z) on the storage devices 112, 122, 132, and 142 to prevent data loss in case one of the computing devices 110, 120, 130, and 140 becomes unavailable and/or inoperative (e.g., due to a software failure, system failure, or a hardware failure). For example, if computing device 110 crashes (e.g., becomes unavailable and/or inoperable), the storage module 121 may be able to continue providing access to the objects 113A through 113Z because the storage module 111 may replicate and/or copy the objects 113A through 113Z stored on storage device 112 onto storage device 122.

Computing device 110 may be a primary computing device in the set 150 and computing device 120 may be a secondary computing device in the set 150. Computing device 130 may be a primary computing device in the set 160 and computing device 140 may be a secondary computing device in the set 160. In one embodiment, a primary computing device may be responsible for managing access to one or more objects in a storage device coupled to the primary computing device and for storing copies of the one or more objects in a second storage device coupled to the secondary computing device. The primary computing device may also be responsible for transferring objects to a separate computing device (e.g., to computing device 170). The second computing device may take over or continue the management of access to the one or more objects and the transfer of objects to the separate computing device when the primary computing device becomes unavailable or inoperative.

In one embodiment, the computing devices 110 through 140 may propagate any changes that are made to the objects 113A through 133Z (e.g., files and directories) in their corresponding replication directory hierarchy to the other copies of the files and/or directories that are stored on the other storage devices and/or managed by other computing devices 110 through 140. For example, storage device 112 may store object 113A (e.g., a file). A copy of object 113A may be stored on storage device 122. When a change is made to object 113A on storage device 112, the computing device 110 may contact computing device 120 to make the same change to object 113A on storage device 122. Examples of changes can include, and are not limited to, creation of a file, deletion of a file, rename of a file, movement of a file to a different directory, update to the content of a file, creation of a directory, deletion of a directory, movement of a directory to a different directory, etc. Changes to one or more of the objects 113A through 133Z may be referred to as change operations.

In one embodiment, the storage modules 111, 121, 131, and 141 may manage and/or handle access requests to the objects 113A through 133Z. For example, a user of the client computing device 180 may use an application (e.g., a word processing application) to update an object (e.g., a file or document). The client computing device 180 may request and/or initiate a change operation to the object (e.g., may request to update the object) and one of the storage modules 111, 121, 131, and 141 may provide access to the object and/or may perform the change operation.

As illustrated in FIG. 1, computing devices 110, 120, 130, and 140 include respective timestamps 114, 124, 134, and 144. A timestamp may be a string, a number, a representation of a time (e.g., YYYY-MM-DD-hh:mm:ss, where YYYY is the year, MM is the month, DD is the day, hh is the hour, mm is the minute, and ss is the second), and/or any other data that may indicate a point in time. In one embodiment, the timestamps 114, 124, 134, and 144 may indicate times when the last change operation was performed on any object stored in the storage devices 112, 122, 132, and 142, respectively. For example, timestamp 114 may indicate a time when a last change operation (e.g., a new object was added, an object was deleted, an object was moved, an object was modified, etc.) was performed on the objects stored in the storage device 112. In another embodiment, the timestamps 114 and 124 and the timestamps 134 and 144 may indicate the same times. For example, as discussed above, the storage module 111 may perform a change operation to object 113Z stored on storage device 112. The storage module 111 may perform the same change operation or may instruct the storage module 121 to perform the same change operation on object 113Z that is also stored on storage device 122. The storage module 111 may update the timestamp 114 to indicate the time of the change operation. The storage module 111 may update timestamp 124 to indicate the time of the change operation or may instruct storage module 121 to update the timestamp 124.

As discussed above, computing device 110 may be the primary computing device in the set 150 and computing device 130 may be the primary computing device in the set 160. The storage modules 111 and 131 may transfer (e.g., copy and/or replicate) one or more objects to the computing device 170. For example, the storage module 111 may replicate or back up one or more of objects 113A through 113Z to computing device 170 and computing device 170 may store the one or more objects on storage device 172. The storage modules 111 and 131 may transfer one or more objects to the computing device 170 to back up the objects to computing device 170 for redundancy to prevent data loss. In one embodiment, the storage modules 111 and 131 may periodically transfer (e.g., copy and/or replicate) objects to the computing device 170. For example, the storage module 131 may transfer one or more of the objects 133A through 133Z to the computing device 170 at certain times (e.g., once an hour, once every eight hours, once every day, once every week, etc.). In another embodiment, the storage modules 111 and 131 may transfer objects to the computing device 170 when the computing device 170 requests the objects. For example, the computing device 170 may request one or more objects from computing device 110 and the storage module 111 may receive the request and transfer the one or more objects to the computing device 170. The computing device 170 may also periodically request one or more objects from the computing devices 110 and 130. In one embodiment, the computing device 170 may be in a different geographical location (e.g., a different site, city, county, state, country, etc.).

In one embodiment, the storage modules 111 and 131 may update respective timestamps 115 and 135 when transferring one or more objects to the computing device 170. The timestamps 115 and 135 may indicate times when the storage modules 111 and 131 transferred one or more objects to the computing device 170. In one embodiment, the timestamps 115 and 135 may be the same as the timestamps 114 and 134 at the time of the transfer. For example, the timestamp 114 may indicate the time that the latest change operation performed by the storage module 111 on one or more of the objects 113A through 113Z (as discussed above). The storage module 111 may update timestamp 115 to be the same as timestamp 114 when the storage module 111 transfers objects to the computing device 170. The timestamp 115 may indicate that objects that were modified before or at the time indicated at the timestamp 115 and 114 have been transferred to the computing device 170. If a change operation is performed on an object after the transfer, the storage module 111 may update the timestamp 114. When the storage module 111 performs a second transfer, the storage module 111 may update the timestamp 115 to be the same as the updated timestamp 114. In another embodiment, the timestamp 115 and 135 may indicate times when the storage modules 111 and 131 transferred one or more objects to the computing device 170. For example, if the storage module 111 transfers one or more objects to the computing device 170, the timestamp may indicate the time of the transfer.

In one embodiment, a storage module (e.g., storage module 111) may obtain and/or determine times when other storage modules on other computing devices in the distributed file system 102 transferred data to the computing device. For example, when transferring (e.g., copying and/or replicating) one or more objects to the computing device 170, the storage module 111 may request timestamp 135 from computing device 130 and the computing devices may provide the timestamp 135 to the storage module 111. The storage module 111 may also determine an earliest time from the times each computing device transferred objects to the computing device 170. For example, the storage module 111 may analyze the timestamps 115 and 135 to determine which of the timestamps 115 and 135 indicates the earliest time. The storage module 111 may update the timestamp 174 of the computing device 170 to be the same as the timestamp that indicates the earliest time. For example, if the timestamp 135 indicates the earliest time out of the times indicated by timestamps 115 and 135 the storage module 111 may update the timestamp 174 to be the same as timestamp 135.

Because multiple computing devices (e.g., computing device 110 and 130) may transfer data to computing device 170 and the computing device 170 includes one timestamp 174, using the earliest timestamp may help prevent data from being lost. For example, when a secondary computing device (e.g., computing device 120) takes over or continues to transfer objects to the computing device 170, the secondary computing device may not know when the primary computing device last transferred objects to the computing device 170. Because timestamp 174 indicates the earliest time that any of the computing devices in the distributed file system 102 transferred data to the computing device 170, the secondary computing device may determine that all objects up to the time indicated by timestamp 174 have been transferred to the computing device 170. Thus, if the secondary computing device transfers objects that have timestamps later than the timestamp 174, data should not be lost due to the unavailability of the primary computing device.

In one embodiment, the storage module 111 and 131 may use their respective timestamps 115 and 135 when determining whether objects should be transferred to the computing device and/or which objects to transfer to the computing device 170. For example, as discussed above, when storage module 111 transfers one or more objects to the computing device 170, the storage module 111 may update the timestamp 115 to be the same as timestamp 114. When subsequent change operations are performed on one or more objects in storage device 112 the timestamp 114 may be updated to indicate the time of the latest subsequent change operation. The storage module 111 may analyze the timestamps 114 and 115 to determine whether objects should be transferred to computing device 170. For example, if the timestamp 114 indicates a time later than the time indicated by timestamp 115, the storage module 111 may determine that one or more objects have been changed after the time of the last transfer (e.g., the time indicated by timestamp 115). The storage module 111 may analyze the objects 113A through 113Z to determine which of the objects 113A through 113Z has timestamps that indicate that a change operation was performed on the objects after the time indicated by timestamp 115. The storage module 111 may transfer objects that have timestamps that indicate that a change operation was performed on the objects after the time indicated by timestamp 115, to the computing device 170.

In one embodiment the storage modules 121 and 141 may use the timestamp 174 when determining which objects to transfer to the computing device 170. As discussed above, the computing devices 120 and 140 may be secondary computing devices. The computing devices 120 and 140 may not include timestamps 115 and 135 because they are secondary computing devices. In one embodiment, the storage modules 121 and 141 may continue the management of access to the objects 113A through 133Z (that was initially performed by storage modules 111 and 131) if the computing devices 110 and 130 become inoperative. For example, if computing device 110 becomes inoperative (e.g., becomes unavailable, crashes or fails, etc.), the computing device 120 and storage module 121 may continue the management of access to the objects 113A and 113Z because the objects 113A and 113Z (and change operations performed on the objects 113A and 113Z) are replicated onto storage device 122 by storage module 111.

In another embodiment, if computing devices 110 and/or 130 become inoperative (e.g., crash, fail), the storage modules 121 and 141 may continue (e.g., take over) to transfer objects to the computing device 170. For example, storage module 121 may not initially transfer objects to the computing device 170 because the primary computing device 110 of the set 150 may perform the transfers. If storage module 121 determines that computing device 110 has become inoperative, the storage module 121 may continue to transfer objects to the computing device 170 (e.g., may periodically transfer objects to the computing device 170). The storage module 121 may use the timestamp 174 to identify objects to transfer to computing device 170. As discussed above, the timestamp 174 indicates the earliest time when objects were transferred to the computing deice 170 by storage modules 111 and 131. For example, if storage module 111 transferred objects to the computing device on Oct. 2, 2013, at 11:54 AM and the storage module 121 transferred objects to the computing device on Sep. 30, 2013 at 2:30 PM, then the timestamp 174 may indicate the time Sep. 30, 2013 at 2:30 PM. The storage module 121 may analyze the objects 113A through 113Z stored on storage device 122 to identify objects that have timestamps indicating that change operations were performed on the objects at a time after the time indicated by timestamp 174. The storage module 121 may transfer the objects on the storage device 122 that that have timestamps indicating that change operations were performed on the objects at a time after the time indicated by timestamp 174, to the computing device 170.

In one embodiment, one or more of the objects may be stored in different storage devices coupled to different computing devices and multiple client computing devices may access the one or more objects via the different computing devices. For example, client computing device 180 may modify a copy of object 113A that is stored on storage device 112 (via computing device 110 and/or storage module 111). A second client computing device may modify another copy of the object 113 that is stored on storage device 172. The copy of the object 113A stored on the storage device 112 may include modifications and/or changes that are not in the copy of the object 113A stored on the storage device 172 and vice versa. Objects that are stored on multiple storage devices may be associated with a set of timestamps. The set of timestamps may include a timestamp for each location where the object is stored. For example, if the object is stored in three different storage devices coupled to three different computing devices, the set of timestamps for the object may include three different timestamps, one for each of the three different computing devices/storage devices. Each copy of the object may be associated with a set of timestamps. In one embodiment, one or more of the timestamps in the set of timestamps may be updated as the object is modified and/or transferred from one storage device to another storage device (as discussed below in conjunction with FIGS. 3 and 4). In another embodiment, the set of timestamps may be used to determine whether an object should be transferred from one storage device to another storage device (as discussed below in conjunction with FIGS. 3 and 4).

Although two sets 150 and 160 are illustrated in FIG. 1 and two computing devices are illustrated in each of the sets 150 and 160, other embodiments may use a different number of sets and/or a different number of computing devices in each set. In each set, there may be one primary computing device and one or more secondary computing devices.

Figure 2:
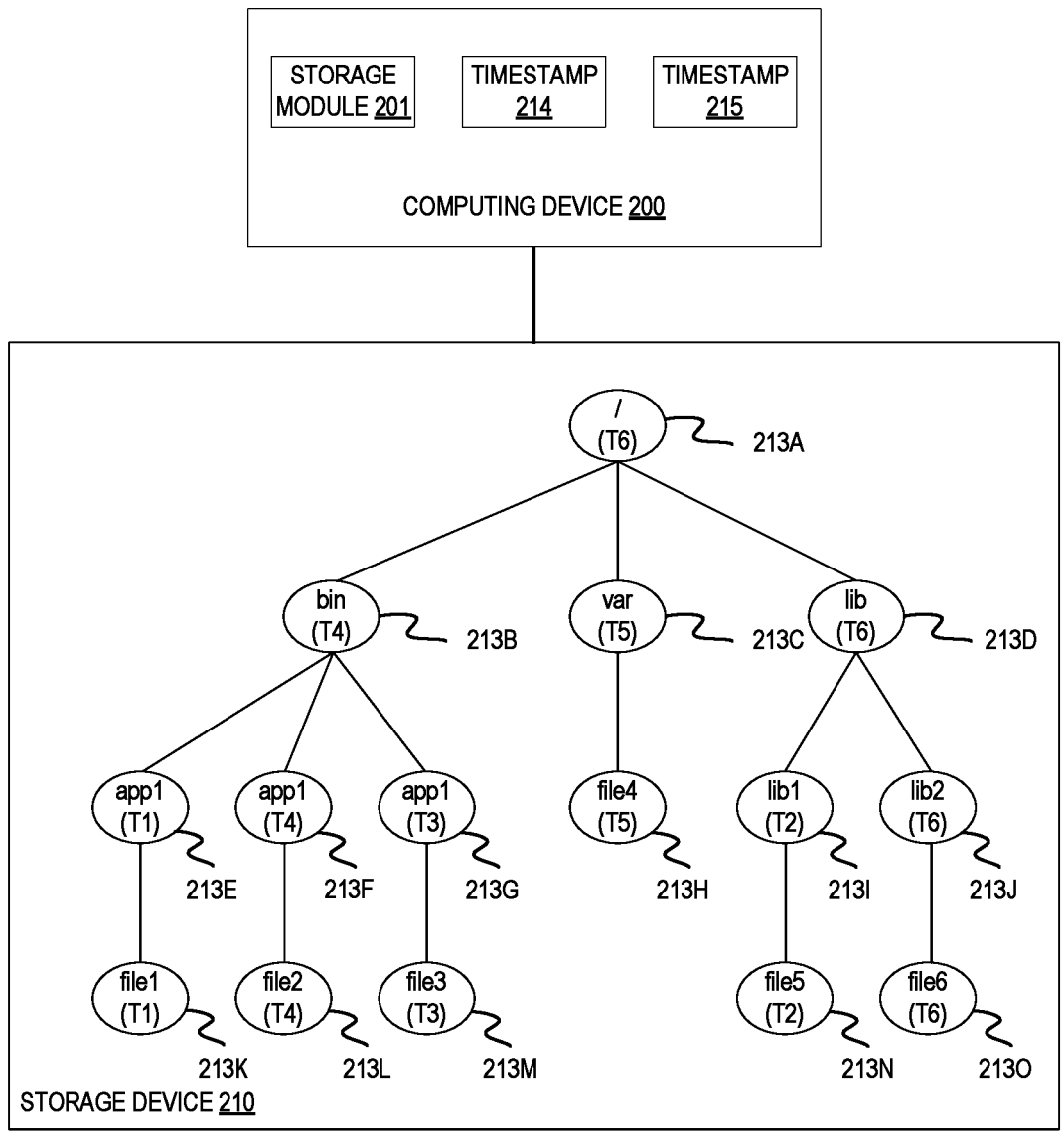
FIG. 2 is a block diagram illustrating an example computing device and an example storage device, in accordance with one embodiment of the present disclosure.

FIG. 2 is a block diagram illustrating an example computing device 200 and an example storage device 210, in accordance with one embodiment of the present disclosure. The computing device 200 is coupled to the storage device 210. In one embodiment, the storage device 210 may be included as part of the computing device (e.g., the storage device 210 may be stored in a housing or a case of the computing device 200). The computing device 200 includes a storage module 201, a timestamp 214, and a timestamp 215. The timestamp 215 may be optional when the computing device 200 operates as a secondary computing device. The storage device 210 includes objects 213A through 213O. As discussed above, the objects 213A through 213O may be files and/or directories.

The objects 213A through 213O are shown in a tree-like structure to illustrate the hierarchy of the objects 213A through 213O. Object 213A is a directory (e.g., a root directory or "/") that includes other directories (e.g., objects 213B through 213D). Object 213B is a directory (e.g., the directory "/bin") that includes other directories (e.g., objects 213E through 213G). Object 213C is a directory (e.g., the directory "/var") that includes a file (e.g., object 213H or "file4"). Object 213D is a directory (e.g., the directory "/lib") that includes other directories (e.g., objects 213I through 213J). Object 213E is a directory (e.g., the directory "/bin/app1") that includes a file (e.g., object 213K or "file1"). Object 213F is a directory (e.g., the directory "/bin/app2") that includes a file (e.g., object 213L or "file2"). Object 213G is a directory (e.g., the directory "/bin/app3") that includes a file (e.g., object 213M or "file3"). Object 213I is a directory (e.g., the directory "/lib/lib1") that includes a file (e.g., object 213N or "file5"). Object 213I is a directory (e.g., the directory "/lib/lib2") that includes a file (e.g., object 213O or "file6").

The objects 213A through 213O may also be associated with and/or may include attributes, such as timestamps, which may indicate a time when the object was modified and/or when another object stored within a sub-tree of the object was modified. The order of the times T1 through T6 (illustrated in FIG. 2) may be as follows: T6>T5>T4>T3>T2>T1, where T6 is the latest time and T1 is the earliest time. In one embodiment, for objects that are files (e.g., object 213N), the timestamps associated with the object indicate the last time a change operation as performed on the objects. For example, object 213O has timestamp indicating that the object 213O was modified at time T6 and the object 213N has a timestamp indicating that the object 213N was modified at time T2. In another embodiment, for objects that are directories, the timestamp for the object may indicate the latest time at which a change operation was performed on other objects in a sub-tree of the object. For example, the object 213B has a timestamp indicating the time T4 because objects 213K, 213L, and 213M are in the sub-tree of object 213B and the latest time of a change operation performed on the objects 213K, 213L, and 213M is T4. In another example, the object 213E has a timestamp indicating the time T1 because the latest time a change operation was performed on an object in the sub-tree of object 213E (e.g., on object 213K) was at time T1.

In one embodiment, the computing device 200 may be a primary computing device in a set of computing devices. The storage module 201 may use the timestamps 214 and 215 to determine which objects in the storage device 210 should be transferred to another computing device (e.g., should be transferred to a computing devices in a different geographical location) to help prevent data loss. The timestamp 214 may indicate when the latest change operation was performed on any object in the storage device 210. For example, the timestamp 214 may indicate the time T6 because the object 213O may be the last object on which a change operation was performed and the timestamp 215 may indicate the time T5 because time T5 may be the last time when objects were transferred to the other computing device. The storage module 201 may determine that one or more objects should be transferred to the other computing device (e.g., the remote computing device) because time T6 is later than time T5 and this may indicate that one or more objects have been modified since the time that the last transfer occurred. The storage module 201 may transfer objects that have timestamps that indicate times later than T5 to the other computing device. For example, the computing device may transfer object 213O to the other computing device but may not transfer objects 213K, 213L, 213M, and 213N because the timestamps for the objects 213K, 213L, 213M, and 213N indicate a time that are earlier than or equal to time T5.

In another embodiment, the computing device 200 may be a secondary computing device in a set of computing devices. As discussed above, the computing device 200 may not include timestamp 215 when the computing device 200 operates as a secondary computing device. The storage module 201 may use a timestamp on another computing device (e.g., timestamp 174 illustrated in FIG. 1) to determine which objects in the storage device 210 should be transferred to the other computing device (e.g., should be transferred to a computing device in a different geographical location) to help prevent data loss. The storage module 201 may determine that a primary computing device in the set is unavailable or inoperable. For example, the storage module 201 may periodically communicate with the storage module on the primary computing device to confirm that the primary computing device is operating or available. If the storage module 201 is unable to communicate with the storage module on the primary computing device, the storage module 201 may determine that the primary computing device in the set is unavailable or inoperable. The storage module 201 may determine that the computing device 200 should take over management of access to the objects in storage device 210 and take over transferring objects to the other computing device (e.g., take over backing up or replicating objects on the other computing device. The storage module 201 may transfer objects with timestamps that indicate a time later than the time indicated by the timestamp on the other computing device. For example, if the timestamp on the other computing devices indicates time T4, the storage module 201 may determine that objects 213H and 213O should be transferred to the other computing device.

Figure 3:
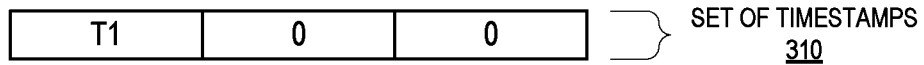
FIG. 3 is a diagram illustrating example sets of timestamps, in accordance with one embodiment of the present disclosure.
Figure 3:
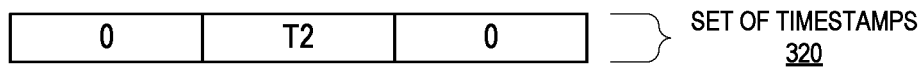

FIG. 3 is a diagram illustrating example sets of timestamps 310 and 320, in accordance with one embodiment of the present disclosure. As discussed above, copies of an object may be stored in multiple storage devices which are coupled to multiple computing devices. Different client computing devices may modify different copies of the object. For example, an object may be stored on three different storage devices. Each copy of the object may be associated with a set of timestamps (e.g., the set of time stamps may be an attribute of each copy of the object). For example, a first copy of the object stored on the first storage device may be associated with the set of timestamps 310 and a second copy of the object stored on the second storage device may be associated with the set of timestamps 320. In one embodiment, the number of timestamps in the sets of timestamps 310 and 320 may be equal to the number of different storage devices where the copies of the object are stored. For example, an object may be stored on three different storage devices and the set of timestamps 310 and 320 each include three timestamps, one for each storage device.

As illustrated in FIG. 3, the set of timestamps 310 has three timestamps: T1, 0, and 0. The set of timestamps 310 may be associated with a first copy of the object stored on a first storage device. The first timestamp T1 in the set of timestamps 310 indicates that the first copy of the object was last modified on the first storage device at time T1. The second and third timestamps in the set of timestamps 310 are "0" and this may indicate the first storage device has not received copies of the object from the second storage device and the third storage device. The set of timestamps 320 may be associated with a second copy of the object stored on a second storage device. The second timestamp in the set of timestamps 320 indicates that the second copy of the object was last modified on the second storage device at time T2. The first and third timestamps in the set of timestamps 310 are "0" and this may indicate the second storage device has not received copies of the object from the first storage device and the third storage device.

In one embodiment, when transferring an object from one storage device to another (e.g., when replicating or backing up an object from one storage device to another storage device), the sets of timestamps for the objects may be analyzed to determine if there are conflicts between the multiple copies of the object. For example, the set of timestamps 310 may be compared with the set of timestamps 320. Each timestamp in the set of timestamps 310 is compared with a corresponding timestamp in the set of timestamps 320. For example, the first timestamp in the set of timestamps 310 (e.g., T1) is compared with the first timestamp in the set of timestamps 320 (e.g., 0), the second timestamp in the set of timestamps 310 (e.g., 0) is compared with the second timestamp in the set of timestamps 320 (e.g., T2), and the third timestamp in the set of timestamps 310 (e.g., 0) is compared with the third timestamp in the set of timestamps 320 (e.g., 0).

In one embodiment, if each timestamp in the set of timestamps 310 is greater than or equal to the corresponding timestamp in the set of timestamps 320, then the object may be transferred from the first storage device to the second storage device. In another embodiment, if each timestamp in the set of timestamps 310 is less than or equal to the corresponding timestamp in the set of timestamps 320, then the object may be transferred from the second storage device to the first storage device. In a further embodiment, if one timestamp in the set of timestamps 310 is greater than the corresponding timestamp in the set of timestamps 320 and another timestamp in the set of timestamps 320 is less than the corresponding timestamp in the set of timestamps 310 (or vice versa), this may indicate that there are conflicts between the multiple copies of the object and that the object should not be transferred from one storage device to another storage device. As illustrated in FIG. 3, the first timestamp in the set of timestamps 310 is greater than the first timestamp in the set of timestamps 320 and the second timestamp in the set of timestamps 320 is less than the second timestamp in the set of timestamps 310. This indicates that there is a conflict in the object and that the object should not be transferred from the first storage device to the second storage device and vice versa. In one embodiment, a storage module may generate an error or a message indicating to an administrator of a distributed file system that the object has been modified in two different locations and that a conflict in the copies of the object has occurred. The administrator may resolve the conflict by merging the two copies of the object into a merged copy and transferring the merged copy to the first storage device and second storage device. In another embodiment, the resolution of the conflict may be performed automatically by an application, a service, and/or a software module.

Figure 4:
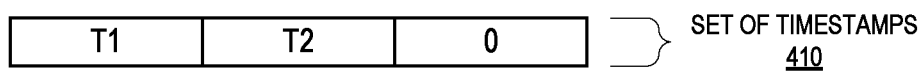
FIG. 4 is a diagram illustrating example sets of timestamps, in accordance with another embodiment of the present disclosure.
Figure 4:
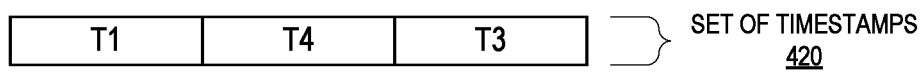

FIG. 4 is a diagram illustrating example sets of timestamps 410 and 420, in accordance with another embodiment of the present disclosure. As discussed above, copies of an object may be stored in multiple storage devices which are coupled to multiple computing devices. For example, an object may be stored on three different storage devices. Each copy of the object may be associated with a set of timestamps (e.g., the set of time stamps may be an attribute of each copy of the object). For example, a first copy of the object stored on the first storage device may be associated with the set of timestamps 410 and a second copy of the object stored on the second storage device may be associated with the set of timestamps 420. In one embodiment, the number of timestamps in the sets of timestamps 410 and 420 may be equal to the number of different storage devices where the copies of the object are stored. For example, an object may be stored on three different storage devices and the set of timestamps 410 and 420 each include three timestamps, one for each storage device.

As illustrated in FIG. 4, the set of timestamps 410 has three timestamps: T1, T2, and 0. The set of timestamps 410 may be associated with a first copy of the object stored on a first storage device. The first timestamp T1 in the set of timestamps 410 indicates that the first copy of the object was last modified on the first storage device at time T1. The second timestamp T2 in the set of timestamps 410 indicates that a copy of the object that was modified on the second storage device at time T2 was received from the second storage device by the first storage device. The third timestamp in the set of timestamps 410 is "0" and this may indicate the first storage device has not received a copy of the object from the third storage device. The set of timestamps 420 has three timestamps: T1, T4, and T3. The set of timestamps 420 may be associated with a second copy of the object stored on a second storage device. The first timestamp T1 in the set of timestamps 420 indicates that a copy of the object that was modified on the first storage device at time T1 was received from the first storage device by the second storage device. The second timestamp T4 in the set of timestamps 420 indicates that the second copy of the object was last modified on the second storage device at time T4. The third timestamp T3 in the set of timestamps 420 indicates that a copy of the object that was modified on the third storage device at time T3 was received from the third storage device by the second storage device.

As discussed above, in one embodiment, when transferring an object from one storage device to another (e.g., when replicating or backing up an object from one storage device to another storage device), the sets of timestamps for the objects may be analyzed to determine if there are conflicts between the multiple copies of the object. For example, the set of timestamps 410 may be compared with the set of timestamps 420. Each timestamp in the set of timestamps 410 is compared with a corresponding timestamp in the set of timestamps 420. For example, the first timestamp in the set of timestamps 410 (e.g., T1) is compared with the first timestamp in the set of timestamps 420 (e.g., T1), the second timestamp in the set of timestamps 410 (e.g., T2) is compared with the second timestamp in the set of timestamps 420 (e.g., T4), and the third timestamp in the set of timestamps 410 (e.g., 0) is compared with the third timestamp in the set of timestamps 420 (e.g., T3). As illustrated in FIG. 4, each timestamp in the set of timestamps 420 is greater than or equal a corresponding timestamp in the set of timestamps 410. This may indicate that the copy of the object stored in the second computing device should be transferred to the first storage device.

Figure 5:
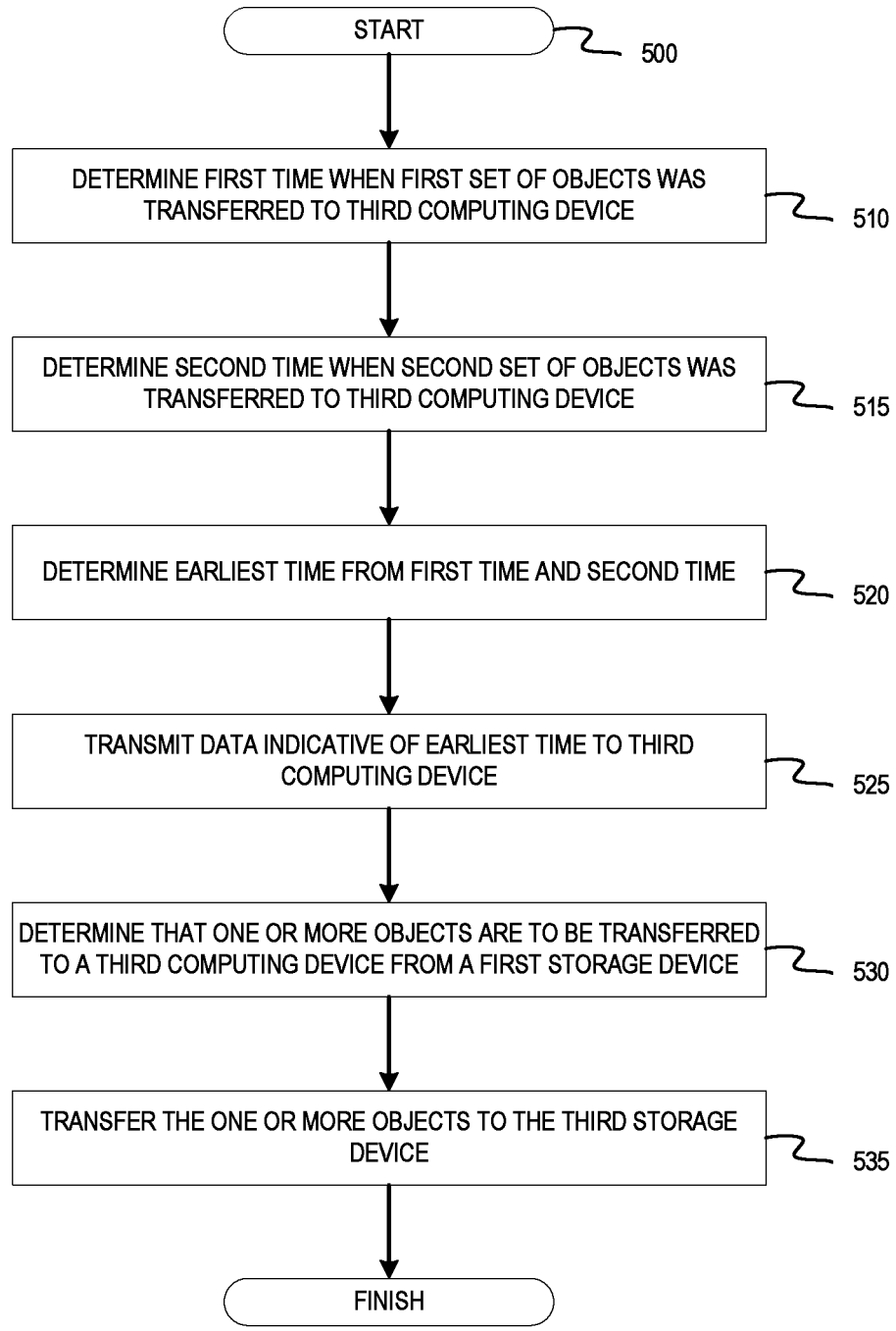
FIG. 5 is a flow diagram illustrating an implementation for a method of transferring objects from a first storage device to a second storage device, in accordance with one embodiment of the present disclosure.
Figure 6:
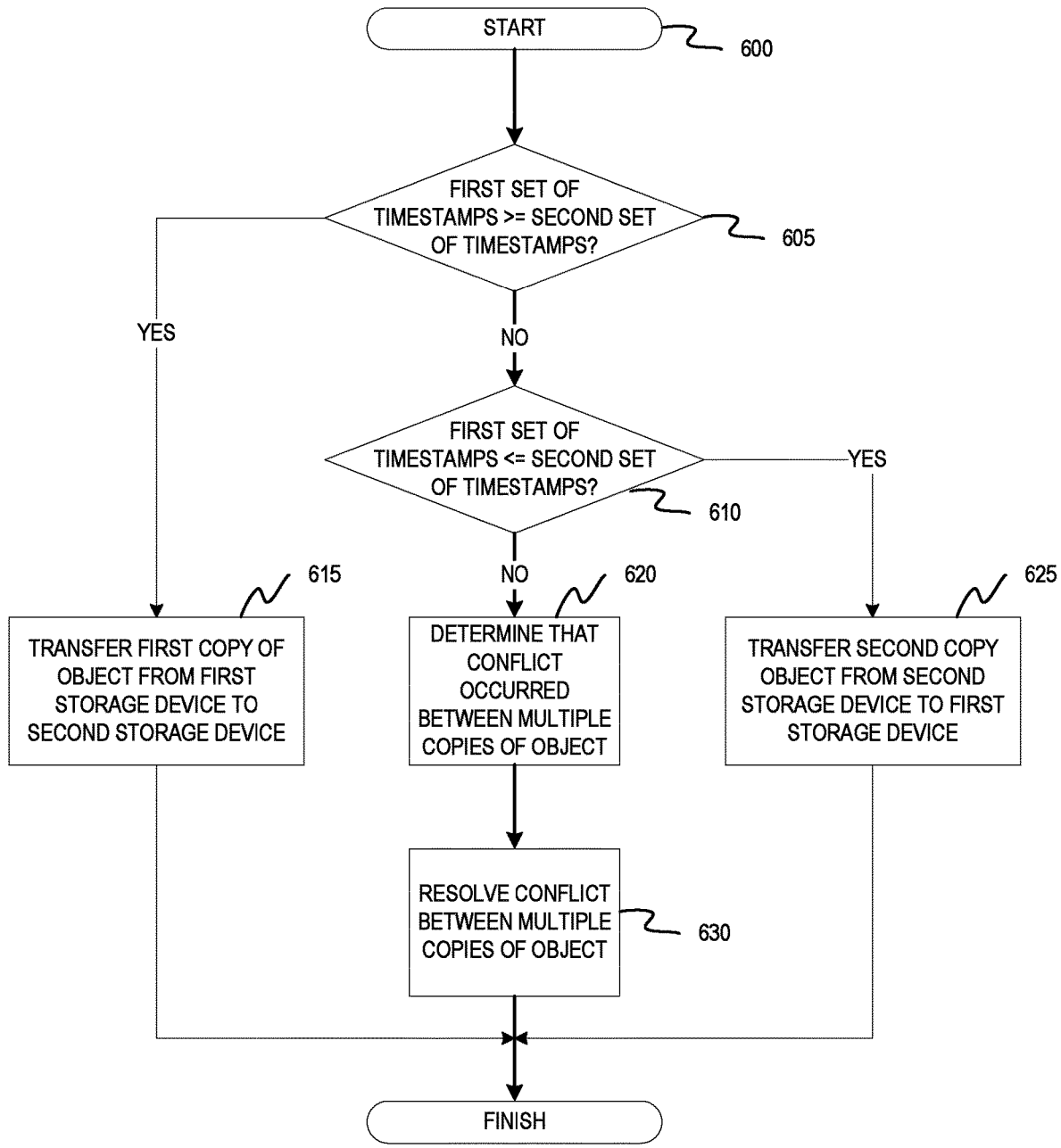
FIG. 6 is a flow diagram illustrating an implementation for a method of transferring objects from a first storage device to a second storage device, in accordance with another embodiment of the present disclosure.

FIGS. 5 and 6 are flow diagrams illustrating methods of transferring objects from a first storage device to a second storage device. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 5 is a flow diagram illustrating an implementation for a method 500 of transferring objects from a first storage device to a second storage device, in accordance with one embodiment of the present disclosure. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by a storage module, as illustrated in FIGS. 1 and 2.

Referring to FIG. 5, the method 500 begins at block 505 where the processing logic determines a first time when a first set of objects was transferred from a first storage device to a third computing device. For example, the processing logic may access a timestamp (e.g., timestamp 114 illustrated in FIG. 1) to determine when the first set of objects was transferred to the third computing device. At block 510, the processing logic determines a second time when a second set of objects was transferred from a second storage device to a third computing device. For example, the processing logic may transmit a request for the second time to a second computing device coupled to the second storage device. The second computing device may provide the second time to the processing logic. The processing logic determines the earliest time from the first and second time at block 515. At block 525, the processing logic may transmit data indicative of the earliest time (e.g., a timestamp) to a third computing device. As discussed above, the third computing device may store objects that are stored on the first storage device and the second storage device. For example, the third computing device may back up and/or replicate the objects stored on the first storage device and the second storage device.

At block 530, the processing logic may determine that one or more objects should be transferred to the third computing device. For example, the processing logic may periodically transfer objects from the first storage device to the third computing device (e.g., may transfer objects every hour, every day, every week etc.). The processing logic may determine that the next time period for transferring objects to the third computing device has occurred. In another example, the processing logic may receive a request for the processing logic to transfer objects to the third computing device. After block 530, the method 500 ends.

FIG. 6 is a flow diagram illustrating an implementation for a method 600 of transferring objects from a first storage device to a second storage device, in accordance with another embodiment of the present disclosure. The method 600 may be performed by processing logic that comprises hardware (e.g., circuitry, dedicated logic, programmable logic, microcode, etc.), software (e.g., instructions run on a processor to perform hardware simulation), or a combination thereof. In one embodiment, method 600 may be performed by a storage module, as illustrated in FIGS. 1 and 2.

As discussed above, multiple copies of an object may be stored in multiple storage devices which are coupled to multiple computing devices. Each copy of the object may be associated with a set of timestamps (e.g., the set of timestamps may be an attribute of each copy of the object). The number of timestamps in the sets of timestamps may be equal to the number of different storage devices where the copies of the object are stored. Referring to FIG. 6, the method 600 begins at block 605 where the processing logic determines whether the first set of timestamps for a first copy of an object stored on a first storage device is greater than or equal to a second set of timestamps for a second copy of the object stored on a second storage device. For example, the processing logic may determine whether each timestamp in the first set of timestamps is greater than or equal to a corresponding timestamp in the second set of timestamps (as discussed above in conjunction with FIGS. 3 and 4). If the first set of timestamps is greater than or equal to the second set of timestamps, the processing logic proceeds to block 615 where the processing logic transfers the first copy of the object from the first storage device to the second storage device. After block 615, the method 600 ends.

Referring back to block 605, if the first set of timestamps is not greater than or equal to the second set of timestamps the processing logic proceeds to block 610 where the processing logic determines whether the first set of timestamps for a first copy of an object stored on a first storage device is less than or equal to a second set of timestamps for a second copy of the object stored on a second storage device. For example, the processing logic may determine whether each timestamp in the first set of timestamps is less than or equal to a corresponding timestamp in the second set of timestamps (as discussed above in conjunction with FIGS. 3 and 4). If the first set of timestamps is less than or equal to the second set of timestamps, the processing logic proceeds to block 625 where the processing logic transfers the second copy of the object from the second storage device to the first storage device. After block 625, the method 600 ends.

Referring back to block 610, if the first set of timestamps is not less than or equal to the second set of timestamps the processing logic proceeds to block 620 where the processing logic determines that a conflict has occurred between the multiple copies of the object. The processing logic proceeds to block 630 where the processing logic may resolve the conflict between the multiple copies of the object. For example, the processing logic may generate an error message and may provide the error message to an administrator of a distributed file system. The administrator may provide instructions or input on how to resolve the conflict to the processing logic. In another example, the processing logic may automatically merge the first copy of the object with the second copy of the object to resolve the conflict. After block 630, the method 600 ends.

Figure 7:
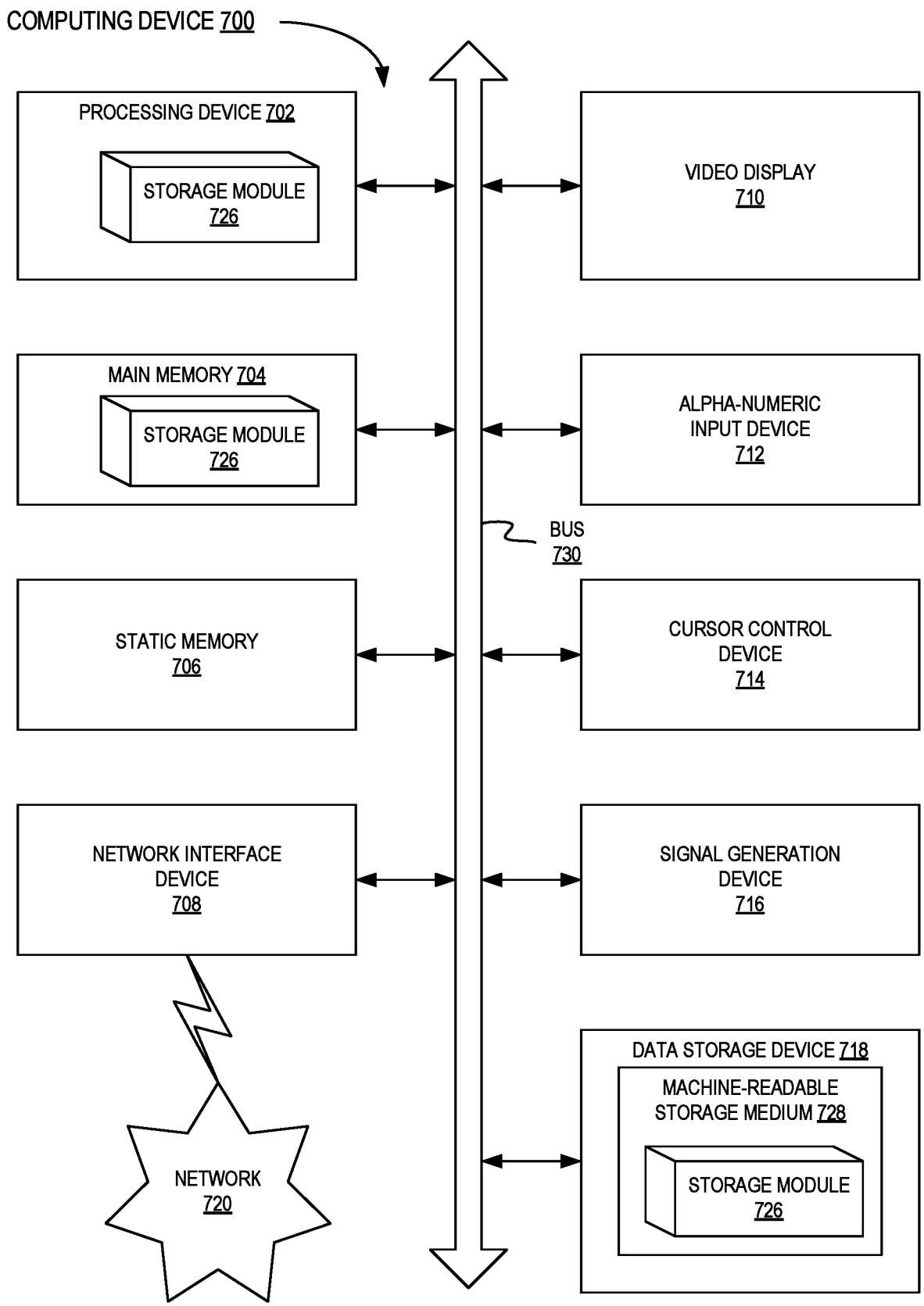
FIG. 7 is a block diagram of an example computer system that may perform one or more of the operations described herein.

FIG. 7 illustrates a diagrammatic representation of a machine in the example form of a computing device 700 within which a set of instructions, for causing the machine to perform any one or more of the methodologies discussed herein, may be executed. The computing device 700 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute storage module 726 for performing the operations and steps discussed herein.

The computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker). In one embodiment, the video display unit 710, the alphanumeric input device 712, and the cursor control device 714 may be combined into a single component or device (e.g., an LCD touch screen).

The data storage device 718 may include a computer-readable storage medium 728 on which is stored one or more sets of instructions (e.g., storage module 726) embodying any one or more of the methodologies or functions described herein. The storage module 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 720 via the network interface device 708.

While the computer-readable storage medium 728 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "transmitting," "receiving," "transferring," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    receiving, by a first computing device of a distributed file system from a second computing device of the distributed file system, a first timestamp associated with a first version of a set of objects stored on the second computing device, the first timestamp corresponding to a modification time of the first version of the set of objects, or a first transfer time of the first version of the set of objects from at least one of the first computing device or a third computing device of the distributed file system to the second computing device;
    identifying a second version of the set of objects stored on the first computing device, the second version of the set of objects having a second timestamp, the second timestamp corresponding to a modification time of the second version of the set of objects or a second transfer time of the second version of the set of objects from at least one of the second computing device or the third computing device to the first computing device; and
    in view of determining that the second timestamp is at a later time than the first timestamp, transferring the second version of the set of objects to the second computing device to be stored on the second computing device.

2. The method of claim 1, wherein transferring the second version of the set of objects to the second computing device is further in view of determining that the third computing device is inoperative.

3. The method of claim 1, further comprising:
    transmitting, from the first computing device to the second computing device, a request for the first timestamp, wherein receiving the first timestamp is in response to transmitting the request for the first timestamp.

4. The method of claim 1, further comprising:
    determining the first timestamp; and
    determining the second timestamp.

5. The method of claim 1, further comprising:
    determining that one or more objects from the first storage device are to be transferred to the third computing device; and
    transferring the one or more objects to the third computing device.

6. The method of claim 5, wherein determining that one or more objects from the first storage device are to be transferred to the third computing device comprises determining that a time period for transferring objects has occurred and wherein times when one or more change operations were performed on the one or more objects are later than the first timestamp.

7. The method of claim 4, wherein determining the second timestamp comprises:
    transmitting a request for the second timestamp to the second computing device; and
    receiving data indicative of the second timestamp from the second computing device.

8. An apparatus comprising:
    a memory to store data;
    a processing device coupled to the memory, the processing device to:
    receive, by a first computing device of a distributed file system from a second computing device of the distributed file system, a first timestamp associated with a first version of a set of objects stored on the second computing device, the first timestamp corresponding to a modification time of the first version of the set of objects, or a first transfer time of the first version of the set of objects from at least one of the first computing device or a third computing device of the distributed file system to the second computing device;
    identify a second version of the set of objects stored on the first computing device, the second version of the set of objects having a second timestamp, the second timestamp corresponding to a modification time of the second version of the set of objects or a second transfer time of the second version of the set of objects from at least one of the second computing device or the third computing device to the first computing device; and
    in view of determining that the second timestamp is at a later time than the first timestamp, transfer the second version of the set of objects to the second computing device to be stored on the second computing device.

9. The apparatus of claim 8, wherein the processing device is to transfer the second version of the set of objects to the second computing device further in view of determining that the third computing device is inoperative.

10. The apparatus of claim 8, wherein the processing device is further to:
    transmit, from the first computing device to the second computing device, a request for the first timestamp, wherein receiving the first timestamp is in response to transmitting the request for the first timestamp.

11. The apparatus of claim 8, wherein the processing device is further to:
    determine the first timestamp; and
    determine the second timestamp.

12. The apparatus of claim 8, wherein the processing device is further to:
    determine that one or more objects from the first storage device are to be transferred to the third computing device; and
    transfer the one or more objects to the third computing device.

13. The apparatus of claim 12, wherein to determine that one or more objects from the first storage device are to be transferred to the third computing device, the processing device is further to:
    determine that one or more objects from the first storage device are to be transferred to the third computing device comprises determining that a time period for transferring objects has occurred and wherein times when one or more change operations were performed on the one or more objects are later than the first timestamp.

14. The apparatus of claim 11, wherein to determine the second timestamp, the processing device is further to:
   transmit a request for the second timestamp to the second computing device; and
   receive data indicative of the second timestamp from the second computing device.

15. A non-transitory computer readable storage medium comprising instructions that, when executed by a processing device, cause the processing device to perform operations comprising:
   receiving, by a first computing device of a distributed file system from a second computing device of the distributed file system, a first timestamp associated with a first version of a set of objects stored on the second computing device, the first timestamp corresponding to a modification time of the first version of the set of objects, or a first transfer time of the first version of the set of objects from at least one of the first computing device or a third computing device of the distributed file system to the second computing device;
   identifying a second version of the set of objects stored on the first computing device, the second version of the set of objects having a second timestamp, the second timestamp corresponding to a modification time of the second version of the set of objects or a second transfer time of the second version of the set of objects from at least one of the second computing device or the third computing device to the first computing device; and
   in view of determining that the second timestamp is at a later time than the first timestamp, transferring the second version of the set of objects to the second computing device to be stored on the second computing device.

16. The non-transitory computer readable storage medium of claim 15, wherein transferring the second version of the set of objects to the second computing device is further in view of determining that the third computing device is inoperative.

17. The non-transitory computer readable storage medium of claim 15, wherein the operations further comprise:
   transmitting, from the first computing device to the second computing device, a request for the first timestamp, wherein receiving the first timestamp is in response to transmitting the request for the first timestamp.

* * * * *